United States Patent
Gualandris et al.

(10) Patent No.: US 11,644,073 B2
(45) Date of Patent: May 9, 2023

(54) BRAKE DISC FLOATING CALIPER FOR SERVICE AND PARKING BRAKING

(71) Applicant: Brembo S.p.A., Bergamo (IT)

(72) Inventors: Massimo Gualandris, Curno (IT); Roberto Sicigliano, Curno (IT); Luca Tadioli, Curno (IT); Mattia Regazzoni, Curno (IT)

(73) Assignee: Brembo S.p.A., Curno (IT)

( * ) Notice: Subject to any disclaimer, the term of this patent is extended or adjusted under 35 U.S.C. 154(b) by 0 days.

(21) Appl. No.: 15/531,236

(22) PCT Filed: Nov. 17, 2015

(86) PCT No.: PCT/IB2015/058894
§ 371 (c)(1),
(2) Date: May 26, 2017

(87) PCT Pub. No.: WO2016/083945
PCT Pub. Date: Jun. 2, 2016

(65) Prior Publication Data
US 2017/0356513 A1    Dec. 14, 2017

(30) Foreign Application Priority Data
Nov. 28, 2014  (IT) .............................. BG2014A0052

(51) Int. Cl.
*F16D 65/18*  (2006.01)
*F16D 55/226*  (2006.01)
(Continued)

(52) U.S. Cl.
CPC ............ *F16D 65/18* (2013.01); *B60T 13/741* (2013.01); *F16D 55/226* (2013.01);
(Continued)

(58) Field of Classification Search
CPC ...... F16D 65/567; F16D 65/18; F16D 55/226; F16D 2127/06; F16D 2123/00;
(Continued)

(56) References Cited

U.S. PATENT DOCUMENTS 3,095,949 A * 7/1963 Butler .................. F16D 55/224
188/106 F
3,791,492 A * 2/1974 Neilsen .................. F16D 59/02
188/106 P
3,934,684 A * 1/1976 Evans .................. F16D 65/567
188/196 D (Continued)

FOREIGN PATENT DOCUMENTS

DE      2406607 A  *  9/1974  ............. F16D 65/18
DE    10327692 A1  *  1/2005  ............ B60T 11/105
(Continued)

*Primary Examiner* — Nicholas J Lane
*Assistant Examiner* — Stephen M Bowes
(74) *Attorney, Agent, or Firm* — Blank Rome LLP

(57) ABSTRACT

A floating caliper (2) for a disc brake comprises a first half-caliper (10), which houses a reaction piston (50), a second half-caliper (12), which houses an action piston (90) and locking means for locking the action piston (90) in a preset parking position. The reaction piston (50) is elastically yielding when the braking action acting on it exceeds a preset parking action threshold which corresponds to said parking position wherein the locking means lock the action piston (90).

8 Claims, 7 Drawing Sheets

(51) Int. Cl.
*B60T 13/74* (2006.01)
*F16D 125/58* (2012.01)
*F16D 127/06* (2012.01)
*F16D 129/10* (2012.01)
*F16D 125/50* (2012.01)
*F16D 129/04* (2012.01)
*F16D 121/24* (2012.01)
*F16D 121/14* (2012.01)
*F16D 125/40* (2012.01)

(52) U.S. Cl.
CPC ...... *F16D 2121/14* (2013.01); *F16D 2121/24* (2013.01); *F16D 2125/40* (2013.01); *F16D 2125/50* (2013.01); *F16D 2125/582* (2013.01); *F16D 2127/06* (2013.01); *F16D 2129/04* (2013.01); *F16D 2129/10* (2013.01)

(58) Field of Classification Search
CPC ............ F16D 2125/66; F16D 2125/24; F16D 2129/04; F16D 2125/582; F16D 2129/10
See application file for complete search history.

(56) References Cited

U.S. PATENT DOCUMENTS

| | | | | |
|---|---|---|---|---|
| 4,194,596 | A * | 3/1980 | Garrett | F16D 55/224 188/366 |
| 4,351,419 | A * | 9/1982 | Garrett | F16D 65/18 188/196 D |
| 4,394,890 | A * | 7/1983 | Kleinhagen, Jr. | F16D 65/567 188/71.9 |
| 5,090,519 | A * | 2/1992 | Golea | F16D 65/18 188/370 |
| 5,366,047 | A * | 11/1994 | Beck | F16D 65/0006 188/72.4 |
| 2005/0173206 | A1* | 8/2005 | Reuter | F16D 65/18 188/72.7 |
| 2005/0258682 | A1* | 11/2005 | Halasy-Wimmer | F16D 65/18 303/89 |
| 2006/0151262 | A1* | 7/2006 | Baumgartner | F16D 65/18 188/72.9 |
| 2012/0261220 | A1* | 10/2012 | Sakashita | F16D 65/18 188/72.6 |
| 2014/0000992 | A1 | 1/2014 | Tajima et al. | |
| 2015/0330466 | A1* | 11/2015 | Masuda | G01B 7/00 188/72.1 |

FOREIGN PATENT DOCUMENTS

| | | |
|---|---|---|
| DE | 11 2012 001 273 T5 | 12/2013 |
| EP | 2447565 A1 * | 5/2012 ........... F16D 65/567 |
| WO | WO 2013/121395 A1 | 8/2013 |
| WO | WO 2014/189089 A1 | 11/2014 |

* cited by examiner

BRAKE DISC FLOATING CALIPER FOR SERVICE AND PARKING BRAKING

This invention relates to a floating caliper for a disc brake for service braking and parking braking of wheels of a vehicle, for example an automobile, a motor vehicle or an aeronautical vehicle, such as a helicopter.

Generally, a floating caliper is particularly appreciated for its reduced overall dimensions, since it provides a pressure chamber on only one side of the disc, and for its high rigidity, which ensures a sudden braking action.

In addition, there is sometimes a need to provide a floating caliper that allows for parking braking, i.e. for the maintenance of a gripped configuration on the disc for an indefinite time, even after the release of the user's action on the pedal or lever.

The purpose of this invention is to provide a floating caliper for disc brake that, while preserving the characteristics of compactness and rigidity, provides for the possibility of parking braking with high reliability.

This purpose is achieved by a floating caliper for disc brake realised according to claim 1. The dependent claims describe variant embodiments.

The characteristics and advantages of the floating caliper according to this invention will be disclosed from the following description, given by way of non-limiting example, in accordance with the accompanying figures, wherein.

With reference to the accompanying figures, numeral 1 generally indicates a caliper group for disc brake intended to cooperate with a brake disc of a vehicle, having a disc axis Z as axis of rotation.

The caliper group 1 comprises a caliper 2 mechanically connected to a stub axle of a wheel of the vehicle in a sliding manner along a sliding axis X perpendicular to the disc axis Z.

For example, the caliper group 1 comprises a bracket with a hole 6 provided with the sliding axis X, required for insertion on the stub axle.

Figure 1:
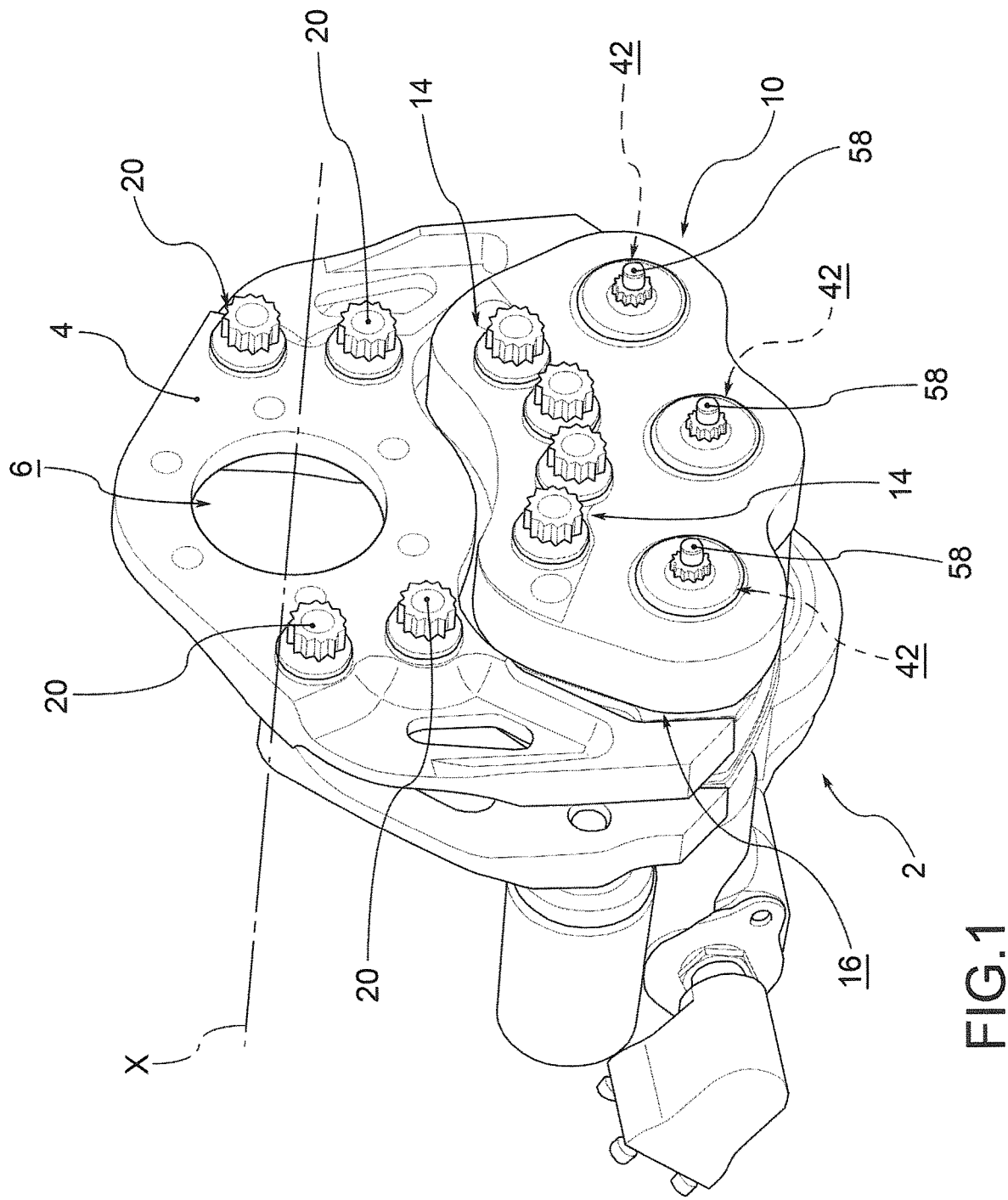
FIG. 1 shows a caliper group for disc brake comprising a caliper according to this invention, according to an inner side view, i.e. the side facing the wheel.
Figure 2:
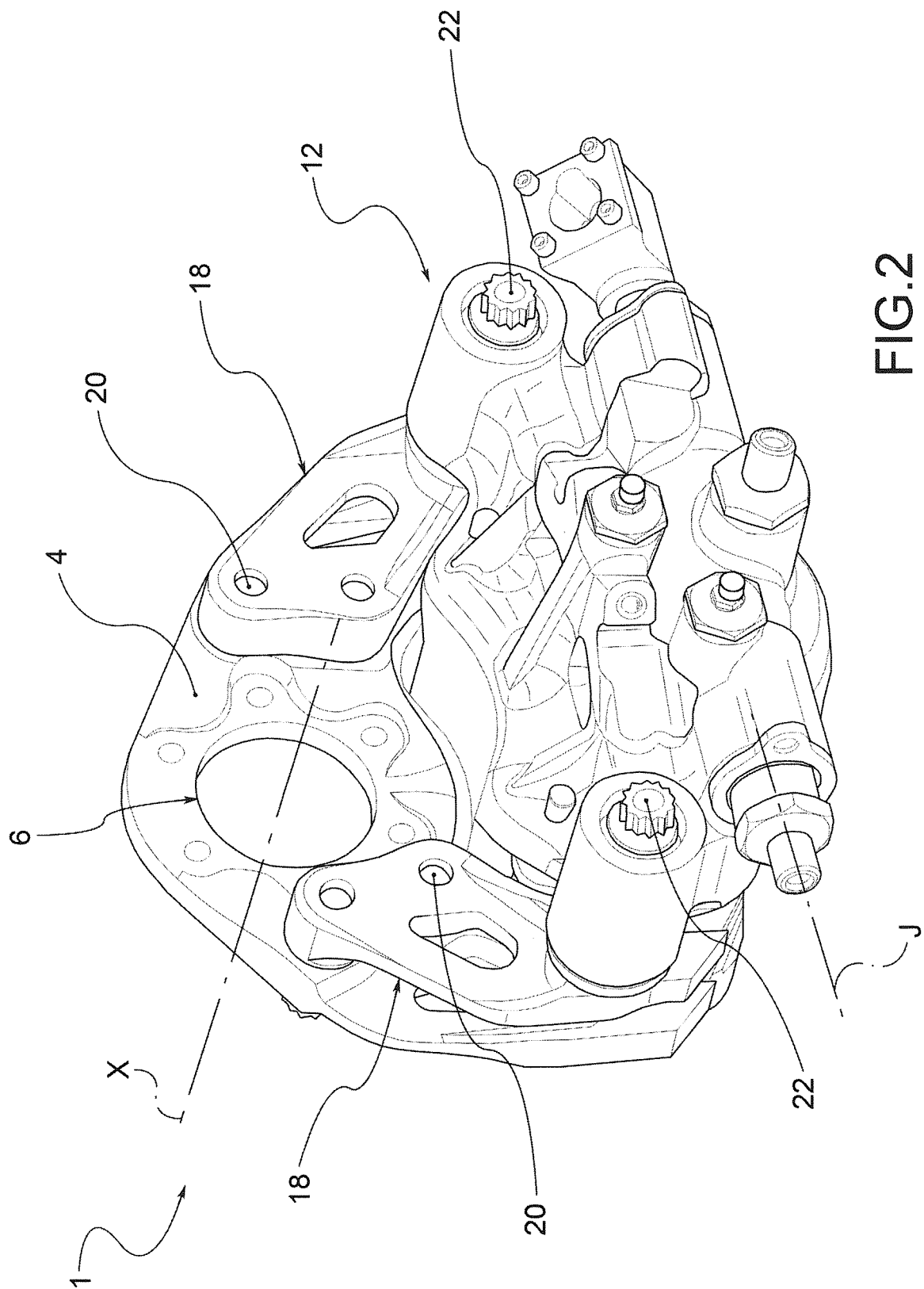
FIG. 2 shows the caliper group of FIG. 1, according to an outer side view.
Figure 3:
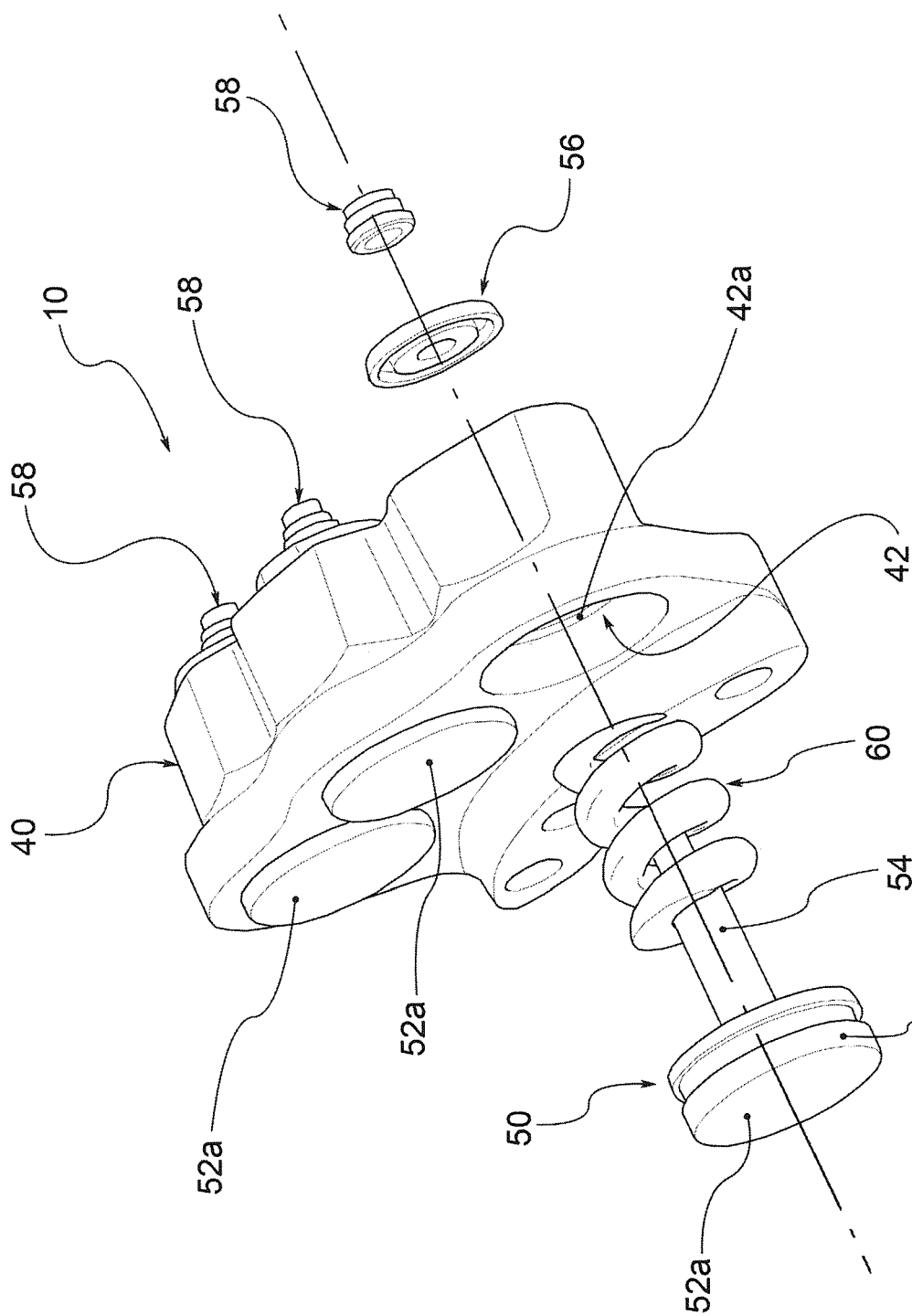
FIG. 3 shows an inner half-caliper of the caliper group of FIG. 1, partially in separate parts.
Figure 4:
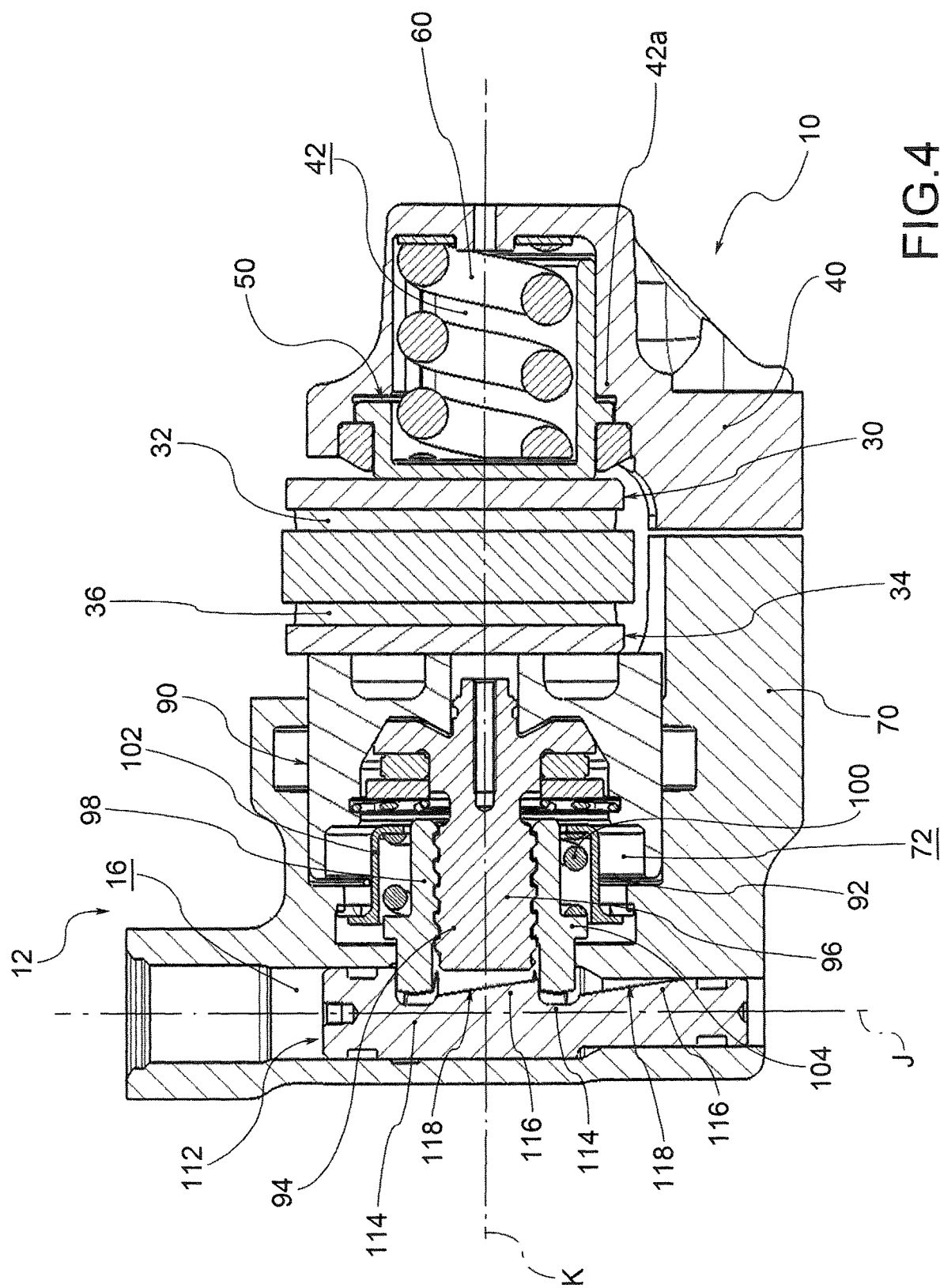
FIG. 4 is a sectional view of a caliper, according to this invention, in a service braking configuration.
Figure 5:
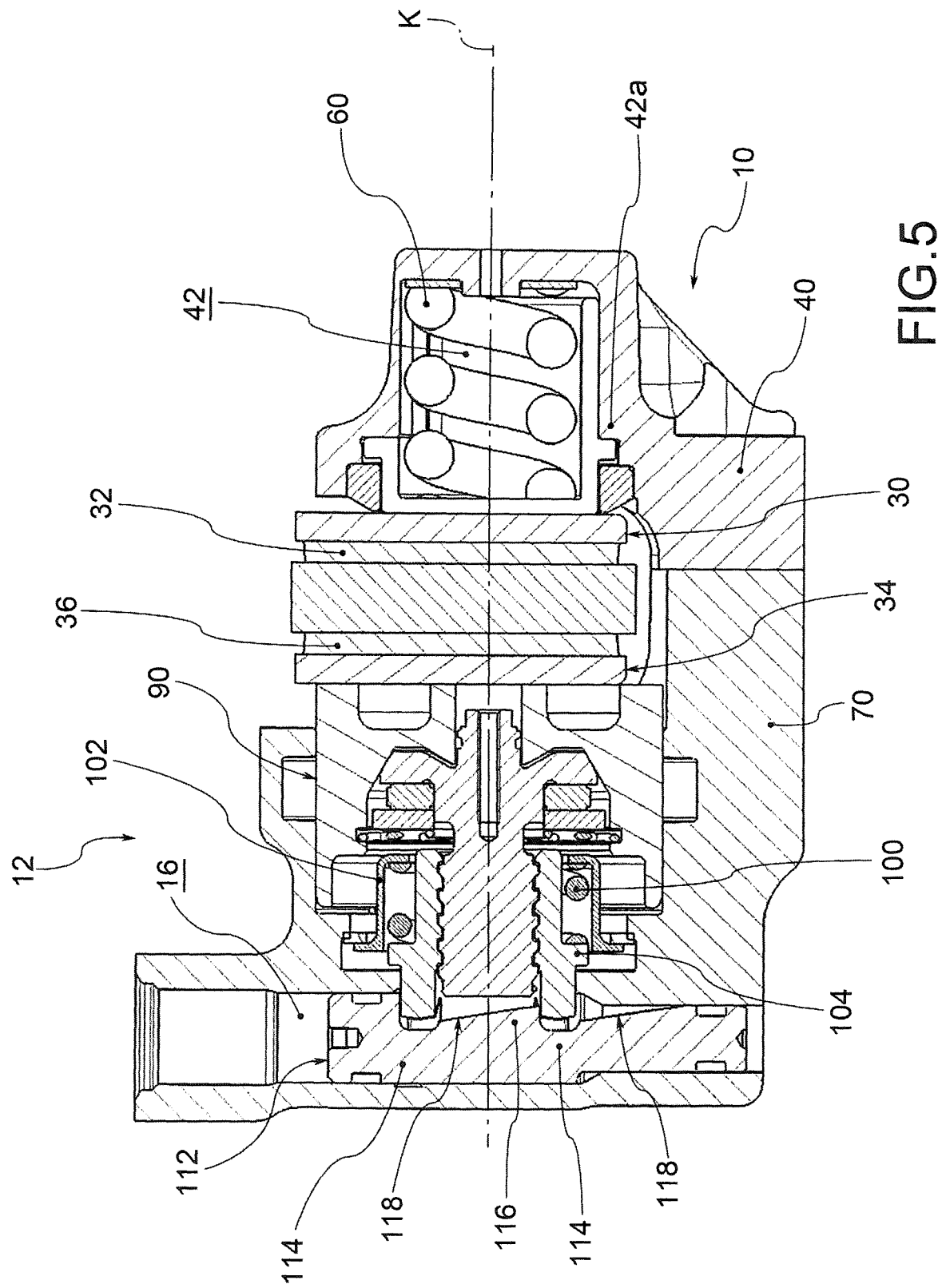
FIG. 5 is a sectional view of the caliper of FIG. 4 in an initial parking braking configuration.
Figure 6:
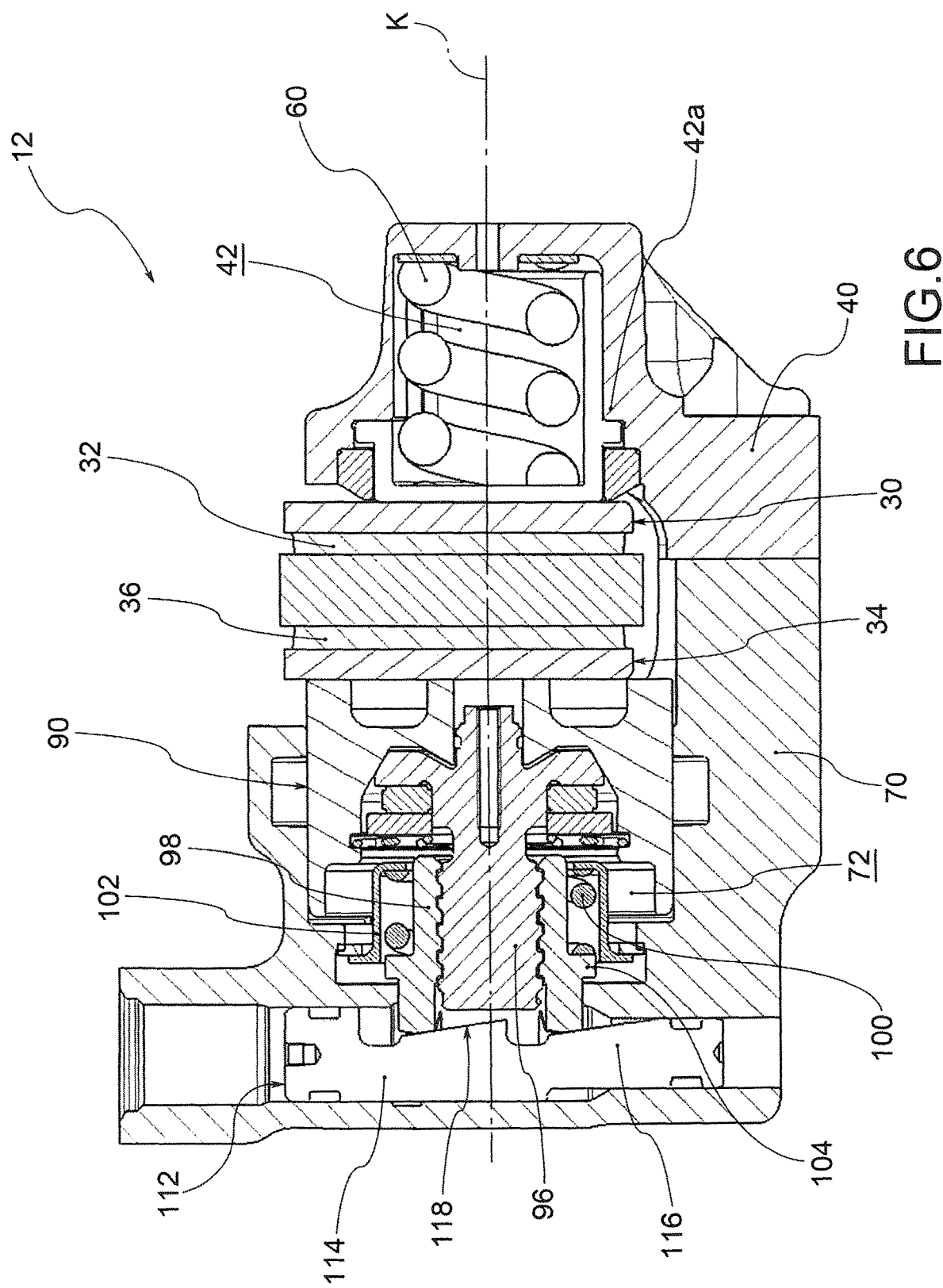
FIG. 6 is a sectional view of the caliper of FIG. 4 in a final parking braking configuration.
Figure 7:
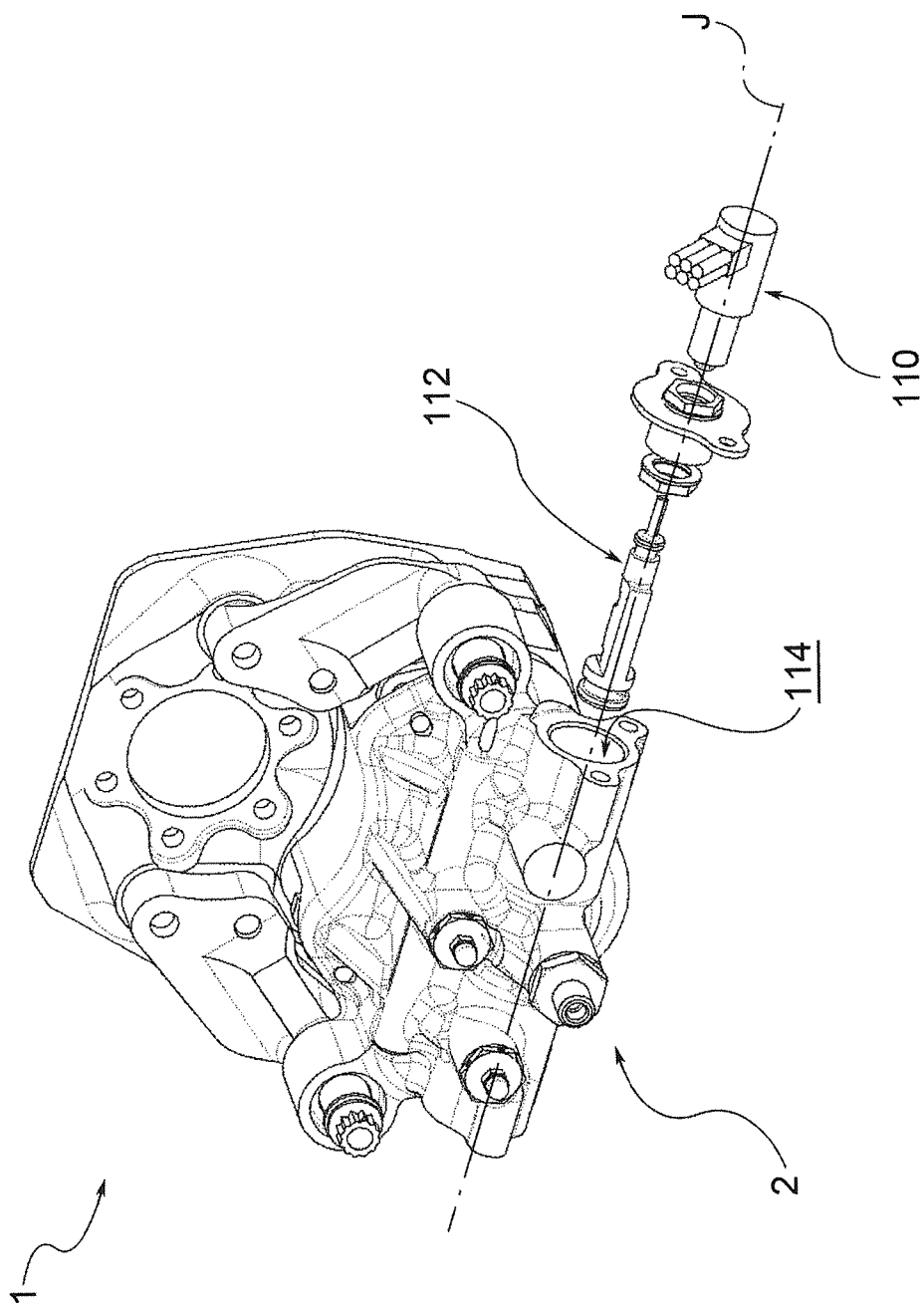
FIG. 7 shows a caliper group comprising a caliper according to this invention, according to an outer side view, partially in separate parts.

The caliper 2 comprises a first half-caliper or inner half-caliper 10, particularly visible in FIG. 1, arranged on the wheel side, and a second half-caliper or outer half-caliper 12, particularly visible in FIG. 2, respectively arranged on one side and the other of the disc and joined together.

For example, the caliper 2 comprises a plurality of first connection screws 14 that rigidly connect the inner half-caliper 10 to the out half-caliper 12.

Preferably, moreover, the bracket 4 has a cut-out 16, counter-shaped with respect to at least a portion of the outer shape of the inner half-caliper 10, and is rigidly connected to a pair of prongs 18, arranged on the side of the outer half-caliper 12, placed one upstream and the other downstream of the sliding axis X (with respect to the direction of rotation of the disc).

The bracket 4 is, for example, connected to the pair of prongs 18 by means of second connection screws 20.

Finally, the prongs 18 are rigidly connected to the outer half-caliper 12, for example by means of third connection screws 22, preferably placed one upstream and the other downstream of the sliding axis X.

The inner half-caliper 10 comprises a first pad 30 or inner pad carrying a first friction material 32 facing the disk from one side, while the outer half-caliper 12 includes a second pad 34 or outer pad carrying a second friction material 36, facing the disk from the other side; in other words, the two pads 30,34 are arranged astride the disc.

The inner half-caliper 10 also comprises a first body 40 or inner body, for example made in one piece, for example by casting, which supports the inner pad 30. The inner body 40 has at least one inner reaction compartment 42.

Additionally, the inner half-caliper 10 comprises at least one reaction piston 50, translatable along a reaction axis W parallel to the disc axis Z and actuatable to operate with a reaction action on said inner pad 30, and at least one elastic reaction element 60, for example a helical spring or a set of cup springs, suitable for operating permanently on said inner pad 30 in thrust towards the braking surface of the disc.

For example, the reaction piston 50 is housed, at least partially, in the inner body 40, in said reaction compartment 42, and is subjected to the action of the elastic reaction element 60, also housed in the reaction compartment 42.

According to a preferred embodiment, the reaction piston 50 comprises a head 52 provided with a head surface 52a suitable to come into contact with the inner pad 30 to push it, and a stem 54, contained in the reaction compartment 42 and projecting from the head 52 along said reaction axis W.

Preferably, the elastic element 60 is inserted on the stem 54, while the end of said stem 54 distal from the head 52 passes through a bottom 56 which abuts against the surface of the inner body 40 of the half-caliper 10; a threaded cap 58 is engageable with the distal end of the stem 54, so that the elastic element 60 is pack-closed in compression between the head 52 and a fixed stop internal to the compartment; for example the bottom of said compartment 42, in an adjustable manner.

In other words, in a rest configuration, the elastic reaction element 60 is prestressed so that the further compression deformation is null until the action on said elastic element 60 due to the reaction piston 50 exceeds a preset parking threshold action.

In yet other words, the reaction piston 50 is elastically yieldable when the braking action acting on it exceeds a preset parking threshold action.

While, the outer half-caliper 12 comprises a second body 70 or outer body, for example made in one piece, for example by casting, which supports the outer pad 34.

The outer body 70 has at least one pressure chamber 72 operatively connected with a hydraulic circuit for supplying pressurised oil to said pressure chamber 72.

Additionally, the inner half-caliper 12 comprises at least one action piston 90, translatable along an action axis W parallel to the disc axis Z and hydraulically actuatable to operate with a braking action on said outer pad 34, which engages the braking surface of the disc, and also provoking a reaction that brings the inner pad 30 to engage the inner braking surface of the disc.

According to a preferred embodiment, the caliper 2 comprises a recovery device 92 of the wear of the friction material of the pads.

For example, said recovery device 92 comprises a gripping element 94 rigidly connected to the action piston. 90, comprising a shank 96 having extension along the action direction K, and a recovery bush 98, screwed onto the shank 96.

Moreover, the recovery device 92 comprises a recovery spring 100, at least partially disposed in the pressure chamber 72, and suitable to operate permanently on the recovery bush 98 away from the action piston 90.

For example, the recovery device 92 comprises a cup 102 inserted on the shank 96, in abutment against a fixed wall of the outer body 70, and the recovery bush 98 comprises a support projection 104, so that the recovery spring 100 is in compression between the bottom of the cup 102 and the support projection 104.

In the normal operation of the caliper 2, in an initial rest configuration, the pressure chamber 72 contains oil not under pressure and the friction material 36 of the outer pad 34 touches the outer braking surface of the disc, without operating any braking action.

In said rest configuration, the elastic reaction element 60 is prestressed so that the further compression deformation is null until the action on said elastic element 60 due to the reaction piston 50 exceeds said preset parking threshold action.

Moreover, even the friction material 32 of the inner pad 30 touches the inner braking surface of the disc, without operating any braking action, since there is no braking action being applied.

During a service braking, the user presses the pedal or actuates the braking lever, bringing pressurised oil into the pressure chamber 72, so that the action piston pushes the outer pad 34 in contact with the outer braking band of the disc; by reaction, the inner pad 30 moves similarly in contact with the inner braking band of the disc; therefore, a service braking is realised.

During service braking, the braking action on the reaction piston is less than the parking action threshold, for which the inner pad 30 is supported substantially rigidly.

For the execution of a parking braking, the service-braking pedal must be actuated together with parking-braking lever or together with a further parking-braking pedal (as in the case, for example, of the application on helicopters), so as to significantly increase the oil pressure in the pressure chamber 72, thus increasing the braking action on the reaction piston, which exceeds said parking action threshold. In addition, it is necessary to activate parking-braking means, for example electrical.

Consequently, when the parking action threshold is exceeded, the elastic reaction element 60 undergoes a further compression, which corresponds to an advancement of the action piston 90, which is brought into a parking position.

The caliper 2 also comprises locking means, operatively connected to said parking-braking actuation means, suitable to lock the action piston 90 in said parking position to keep it in said parking position even when the service-braking means are deactivated.

For example, said locking means comprise an electric parking motor 110 and a locking element 112, operatively connected to the electric parking motor 110, to be moved from an inactive position, in which it does not interfere with the action piston 90, to an active position in which it structurally interferes with the action piston 90, locking it in the parking position.

For example, the locking element 112 is a shape element elongated along a direction of engagement J, for example orthogonal to the action direction K, translatable along said engagement direction J.

The locking element 112 is shaped so as to have, along said engagement direction J, at least one disengagement portion 114 and at least one engagement portion 116, protruding radially with respect to the first, so that, by translation of the locking element from the disengagement position to the engagement position, the engagement portion 116 structurally interferes with the piston 90, locking it in the parking position.

For example, said disengagement portion 114 and said engagement portion 116 are realised by at least one inclined plane 118, which gives the locking element a wedge shape, for example in sections.

In an embodiment variant, the electric parking motor is of the rotary type and is connected to a locking element translatable by means of a worm screw-rack system; in a yet further embodiment variant, the electric parking motor is of the rotary type and is connected to a locking element having a cam profile with engagement and disengagement portions.

Preferably, the electric parking motor 110 and the locking element 112 are housed in an auxiliary compartment 116, having extension along said engagement direction J.

The locking means are reversible by actuation; in other words, by commanding the electric parking motor 110, the locking element 112 is disengageable from the action piston 90, so that, in the absence of a service-braking action, said action piston 90 and the reaction piston 50 release the disc.

According to a preferred embodiment, said locking means cooperate with the recovery bush 98 of the recovery device 92.

In particular, to recover the wear of the friction material of the pads, the unscrewing of the recovery bush 98 from the shank 96 allows the recovery bush 98 to come out more from the pressure chamber 72, allowing the correct engagement with the locking element 112.

Moreover, the caliper 2 comprises primary detection means suitable to indicate the presence of the action piston 90 in the parking position or the presence of the outer pad 34 in the position corresponding to the parking position of the action piston 90.

For example, said primary detection means comprise a microswitch, supported by the outer body 70, that detects the presence of the outer pad 34 in the position corresponding to the parking position of the action piston 90.

In addition, the caliper 2 comprises secondary detection means suitable to indicate the arrangement of the locking means in the active configuration, for example the presence of the locking element 112 in the active position.

For example, said secondary detection means comprise a microswitch, arranged inside the auxiliary compartment 116 of the outer body 70, near the end of said locking element 112, suitable to indicate the presence of the locking element 112, or of a portion thereof, in the active position.

In addition, the caliper 2 comprises auxiliary detection means suitable to indicate the arrangement of the locking means in the inactive configuration, for example the presence of the locking element 112 in the inactive position. The floating caliper may have, if desired, auxiliary detection means suitable to indicate the position of the locking means in the inactive configuration.

For example, said auxiliary detection means comprise a microswitch, arranged inside the auxiliary compartment 116 of the outer body 70, near the end of said locking element 112, suitable to indicate the presence of the locking element 112, or of a portion thereof, in the inactive position.

Said parking-braking actuation means, said locking means, said primary detection means and/or said secondary detection means and/or said auxiliary detection means are operatively connected to a control unit of a braking system, able to process the signals received.

In particular, in the presence of an actuation signal coming from the parking-braking actuation means and a presence signal coming from the primary detection means, the control unit commands the locking means, by actuating the electric parking motor 110 to bring the locking element 112 in the engagement position, so as to lock the action piston 90 in the parking position. In addition, in the presence of a presence signal coming from the secondary detection means, the control unit signals to the operator, for example on a display, the successful actuation of parking braking.

Similarly, in the presence of a disactuation signal coming from the parking-braking actuation means, the control unit commands the locking means, by actuating the electric parking motor 110 to bring the locking element 112 in the disengagement position, so as to release the action piston 90 from the parking position. In addition, in the presence of a presence signal coming from the auxiliary detection means, the control unit signals to the operator, for example on a display, the successful disactuation of parking braking.

According to a preferred embodiment, due to the increase of pressure in the pressure chamber, which is necessary in order to reach the parking action threshold that allows the actuation of the parking brake, an oil pump is provided, connected to a further electric motor, operatively connected to the hydraulic circuit and controlled by the control unit.

In this embodiment, in the presence of an actuation signal coming from the parking-braking actuation means, the control unit actuates the oil pump, contributing to the increase of pressure in the pressure chamber 72; subsequently, in the presence of a presence signal coming from the primary detection means, the control unit commands the locking means, by actuating the electric parking motor 110 to bring the locking element 112 in the engagement position, so as to lock the action piston 90 in the parking position.

According to a further embodiment, the parking-braking actuation means comprise a control valve located on the hydraulic circuit to actuate the locking means through hydraulic pressure.

According to a further embodiment, a further oil pump is provided, operatively connected to the hydraulic circuit to generate braking pressure when actuated by a further electric motor actuatable by means of the pedal.

Innovatively, the caliper according to this invention allows maintaining reduced overall dimensions, while integrating the components necessary for parking braking into it.

Moreover, advantageously, the system that allows parking braking is very reliable, because the failure of the reaction piston greatly reduces the action necessary so that the action piston arrives in the parking position suitable for locking.

According to a further advantageous aspect, the system that allows parking braking is very reliable, because the electric parking motor is only actuated to move the locking element in engagement or disengagement, without overcoming the parking-braking action.

It is clear that one skilled in the art, in order to meet contingent needs, may make changes to the caliper described above, all contained within the scope of protection defined by the following claims.

The invention claimed is:

1. A floating caliper for a disc brake, comprising:
a first half-caliper;
a second half-caliper; and
locking means;
wherein the first half-caliper includes a first pad provided with a first friction material and a reaction piston suitable to support the first pad against a disc;
wherein the second half-caliper is joined to the first half-caliper, and wherein the second half-caliper includes a second pad provided with a second friction material, a pressure chamber suitable to be placed in communication with a hydraulic circuit, an action piston sliding in said pressure chamber in a direction of action, and suitable to push the second pad against the disc, and a wear recovery device connected to the action piston, wherein the action piston is translatable in the direction of action, wherein the recovery device includes a threaded cylindrical bush, wherein the cylindrical bush has a circular outer end, and wherein the cylindrical bush is rotatable, around an axis aligned with the direction of action, to adjust the second half-caliper;
wherein the locking means is suitable to interact with the circular outer end of the threaded cylindrical bush to lock the action piston in a predefined parking position, the locking means comprising an electric parking motor, a locking element, and an operative connection between the electric parking motor and the locking element,
wherein the locking element has an elongated shape along a direction of engagement, wherein the locking element has a first side and a second side, wherein the first side of the locking element is elongated in the direction of engagement, wherein the second side of the locking element includes first and second engagement portions and first and second disengagement portions, wherein the first engagement portion is located between the first and second disengagement portions in the direction of engagement, wherein the second disengagement portion is located between the first and second engagement portions in the direction of engagement, wherein the direction of engagement is orthogonal to the direction of action,
wherein the locking element is operatively connected to the electric parking motor by the operative connection, and movable by the electric parking motor, in the direction of engagement, from an inactive position, in which the first and second engagement portions of the locking element are not in contact with the recovery device, such that the locking element does not interfere with the action piston, to an active position, in which the first and second engagement portions of the locking element are in contact with the circular outer end of the cylindrical bush of the recovery device, such that the first and second engagement portions of the locking element structurally interfere with the action piston, locking the action piston in the parking position;
wherein the floating caliper further comprises an elastic element adapted to operate permanently on the reaction piston, the elastic element being pre-stressed in a rest position to make the reaction piston elastically yielding when the braking action acting on it exceeds a predetermined parking action threshold which corresponds to the parking position in which the locking means locks the action piston;

wherein the locking means is reversible by actuation, by commanding the electric parking motor, to cause the locking element to be disengaged from the action piston such that, in the absence of a service-braking action, the action piston and the reaction piston release the disc;

wherein the locking element is movable by the electric parking motor in a direction opposite to the direction of engagement, from the active position to the inactive position, and wherein the operative connection of the locking means is configured such that the locking element is pulled by the electric parking motor in the direction opposite to the direction of engagement, from the active position to the inactive position;

wherein the electric parking motor in the inactive position does not interfere with the action piston; and wherein the second side of the locking element includes first and second sections, wherein the first section includes the first engagement portion and the first disengagement portion, wherein the second section includes the second engagement portion and the second disengagement portion, wherein the first engagement portion protrudes radially outward relative to the first and second disengagement portions, in a direction orthogonal to the direction of engagement, wherein the second engagement portion protrudes radially outward relative to the first and second disengagement portions, in a direction orthogonal to the direction of engagement, wherein the second side of the locking element accommodates rotation of the circular outer end of the cylindrical bush around the axis aligned with the direction of action, and such that the second side of the locking element conforms to the outer circular outer end of the cylindrical bush when the cylindrical bush is rotated, around the axis aligned with the direction of action, to adjust the second half caliper, and wherein the first and second engagement portions are not in contact with the circular outer end of the cylindrical bush when the locking element is moved by the motor to the inactive position.

2. The floating caliper of claim 1, wherein the first side of the locking element includes a partial cylindrical surface having a cylindrical axis aligned with the direction of engagement.

3. The floating caliper according to claim 2, comprising an elastic element suitable to operate permanently on the reaction piston and pre-stressed in a rest condition to make the reaction piston elastically yielding.

4. The floating caliper according to claim 2, wherein the electric parking motor and the locking element are housed in an auxiliary compartment of a body of the second half-caliper, and wherein the parking motor, the locking element, and the auxiliary compartment are aligned in the direction of engagement.

5. The floating caliper according to claim 2, comprising primary detection means suitable to indicate the presence of the action piston in the parking position or the presence of the second pad in the position corresponding to the parking position of the action piston.

6. The floating caliper according to claim 2, comprising detection means suitable to indicate the presence of the locking means in an active configuration.

7. The floating caliper according to claim 2, comprising detection means suitable to indicate the position of the locking means in an inactive configuration.

8. A braking system comprising:
a floating caliper;
actuation means; and
a control unit;
wherein the floating caliper includes a first half-caliper, a second half-caliper; and locking means;
wherein the first half-caliper includes a first pad provided with a first friction material and a reaction piston suitable to support the first pad against a disc;
wherein the second half-caliper is joined to the first half-caliper, and wherein the second half-caliper includes a second pad provided with a second friction material, a pressure chamber suitable to be placed in communication with a hydraulic circuit, an action piston sliding in said pressure chamber in a direction of action, and suitable to push the second pad against the disc, and a wear recovery device connected to the action piston, wherein the action piston is translatable in the direction of action, wherein the recovery device includes a threaded cylindrical bush, wherein the cylindrical bush has a circular outer end, and wherein the cylindrical bush is rotatable, around an axis aligned with the direction of action, to adjust the second half-caliper;

wherein the locking means is suitable to interact with the circular outer end of the threaded cylindrical bush to lock the action piston in a predefined parking position, the locking means comprising an electric parking motor, a locking element, and an operative connection between the electric parking motor and the locking element, wherein the locking element has an elongated shape along a direction of engagement, wherein the locking element has a first side and a second side, wherein the first side of the locking element is elongated in the direction of engagement, wherein the first side of the locking element includes a partial cylindrical surface having a cylindrical axis aligned with the direction of engagement, wherein the second side of the locking element includes first and second sections, wherein the second side of the locking element includes first and second engagement portions and first and second disengagement portions, wherein the first section includes the first engagement portion and the first disengagement portion, wherein the second section includes the second engagement portion and the second disengagement portion, wherein the first engagement portion is located between the first and second disengagement portions in the direction of engagement, wherein the second disengagement portion is located between the first and second engagement portions in the direction of engagement, wherein the first engagement portion protrudes radially outward relative to the first and second disengagement portions, in a direction orthogonal to the direction of engagement, wherein the second engagement portion protrudes radially outward relative to the first and second disengagement portions, in a direction orthogonal to the direction of engagement, wherein the second side of the locking element accommodates rotation of the circular outer end of the cylindrical bush around the axis aligned with the direction of action, and such that the second side of the locking element conforms to the outer circular outer end of the cylindrical bush when the cylindrical bush is rotated, around the axis aligned with the direction of action, to adjust the second half caliper, and wherein the direction of engagement is orthogonal to the direction of action, wherein the locking element is operatively connected to the electric parking motor by the operative connection, and movable by the electric parking motor, in the direction of engagement, from an inactive position, in which the first and second engagement portions of the locking element are not in contact with the recovery device, such that the locking element does not interfere with the action piston, to an active position, in which the first and second engagement portions of the locking element are in contact with the circular outer end of the cylindrical bush of the recovery device, such that the first and second engagement portions of the locking element structurally interfere with the action piston, locking the action piston in the parking position;

wherein the floating caliper further comprises an elastic element adapted to operate permanently on the reaction piston, the elastic element being pre-stressed in a rest position to make the reaction piston elastically yielding when the braking action acting on it exceeds a predetermined parking action threshold which corresponds to the parking position in which the locking means locks the action piston;

wherein the locking means is reversible by actuation, by commanding the electric parking motor, to cause the locking element to be disengaged from the action piston such that, in the absence of a service-braking action, the action piston and the reaction piston release the disc;

wherein the locking element is movable by the electric parking motor in a direction opposite to the direction of engagement, from the active position to the inactive position, with the first and second engagement portions not being in contact with the circular outer end of the cylindrical bush when the locking element is moved by the motor to the inactive position, and wherein the operative connection of the locking means is configured such that the locking element is pulled by the electric parking motor in the direction opposite to the direction of engagement, from the active position to the inactive position; and wherein the electric parking motor in the inactive position does not interfere with the action piston.

\* \* \* \* \*